United States Patent [19]

Kruth

[11] 4,370,536
[45] Jan. 25, 1983

[54] EFFICIENCY ADAPTIVE EDM APPARATUS AND METHOD

[75] Inventor: Jean-Pierre Kruth, Heverlee, Belgium

[73] Assignee: Ateliers des Charmilles, S.A., Geneva, Switzerland

[21] Appl. No.: 147,507

[22] Filed: May 7, 1980

[30] Foreign Application Priority Data

May 8, 1979 [CH] Switzerland .................. 4302/79

[51] Int. Cl.³ .................................. B23P 1/08
[52] U.S. Cl. ........................ 219/69 M; 219/69 P; 219/69 S; 219/69 G
[58] Field of Search ............... 219/69 C, 69 M, 69 P, 219/69 S, 69 R, 69 G; 315/227 A

[56] References Cited

U.S. PATENT DOCUMENTS

| | | | |
|---|---|---|---|
| 3,860,779 | 1/1975 | Marendaz | 219/69 G |
| 3,988,560 | 10/1976 | Losey et al. | 219/69 C |
| 3,996,445 | 12/1976 | Wohlabaugh | 219/69 C |
| 4,005,303 | 1/1977 | Inoue | 219/69 C |
| 4,071,729 | 1/1978 | Bell, Jr. | 219/69 C |
| 4,146,770 | 3/1979 | Dinsdale et al. | 219/69 C |

Primary Examiner—B. A. Reynolds
Assistant Examiner—M. H. Paschall
Attorney, Agent, or Firm—Hauke and Patalidis

[57] ABSTRACT

An EDM apparatus provided with an adaptive self-correcting system for achieving optimum maximum efficiency of machining operations. As the machining performance factor or index of an EDM apparatus continuously varies as a function of one of the machining parameters as, for example, the cut-off time interval between consecutive electrical discharges, such that the maximum performance index, achieved for a given optimum cut-off time interval, deteriorates rapidly when the cut-off time interval is shortened, thus resulting in poor and unstable machining conditions, the invention contemplates varying the cut-off time interval in successive steps, the steps being larger when operating along the negative slope portion of the representative curve of the performance index as a function of the cut-off time interval duration, and the steps being much smaller when operating within the portion of the representative curve having a positive slope. In addition, the invention contemplates reducing the steps to a much smaller value within a buffer or safety zone in the portion of the representative curve of negative slope proximate to the top of the curve.

12 Claims, 3 Drawing Figures

EFFICIENCY ADAPTIVE EDM APPARATUS AND METHOD

BACKGROUND OF THE INVENTION

The invention relates to a method and apparatus for machining by electrical discharges an electrode workpiece by way of an electrode tool, wherein consecutive voltage pulses are applied between the electrodes. More particularly, the invention relates to an EDM method and apparatus permitting to develop a variable magnitude which is a characteristic of the machining performance of efficiency factor or index, and to automatically vary step by step one of the machining conditions or parameters such as to operate at the maximum value of the machining performance index.

The cut-off time interval between consecutive voltage pulses, in an EDM apparatus, is an important machining parameter which is known to affect the machining efficiency and which, when properly utilized, permits to obtain maximum machining efficiency. The performance factor or index or, in other words, the machining efficiency, is capable of quantitative representation as a function of any one of a plurality of machining conditions or parameters such as, for example the machining parameter corresponding to the total duration of all the effectively machining electrical discharges within a predetermined time frame. When the length of the cut-off time interval between two consecutive voltage pulses is decreased, a corresponding decrease of the number of effective electrical discharges is observed due to a downgrading of the quality of the electrical discharges, and consequently of the machining efficiency. When, on the contrary, the duration of the cut-off time interval is increased, a corresponding decrease of the number of effective electrical discharges during the same time frame is observed, with the result that the machining efficiency tends to also decrease. Between these extremes in cut-off time interval duration, there exists a zone of operation in which the machining efficiency, or the over-all performance index of the EDM apparatus, reaches a maximum value.

Through the utilization of appropriate logic circuitry, it is possible to provide the machine operator with a visual display of a magnitude representative of the machining efficiency, or to utilize an electrical magnitude representative of the machining efficiency for automatically controlling and modifying the machining parameters such as to optimize the machining conditions as, for example, disclosed in U.S. Pat. No. 4,090,961, assigned to the same assignee as the present application. The speed at which the apparatus corrects itself, so as to be self-adaptative, can yet be improved as provided by the present invention, by automatically varying step by step the duration of the cut-off time interval between consecutive pulses, and by multiplying the difference or increment between consecutive steps by the slope of the representative curve of the machining efficiency in function of the duration or length of the cut-off time interval.

A good approximation of the value of the slope results from effecting the quotient of the change in machining efficiency by the corresponding step increment of the variation in duration of the cut-off time interval that originally caused the resulting change in machining efficiency. In this manner, the increment steps by which the duration of consecutive cut-off time intervals is varied are small when operating proximate the top of the machining efficiency representative curve, and the step increments are wider when operating at a portion of the representative curve distant from its top. However, it has been observed that if there occurs an accidental incursion into a critical zone corresponding to very short cut-off time intervals that cause the representative curve to have a positive slope, an increase of the duration or length of the cut-off time interval does not permit to achieve immediately a substantial improvement of the machining efficiency. In other words, it has been observed that excessive degradation of the machining conditions gives rise to a downgrading phenomenon resembling hysterisis which impedes rapid reestablishment of favorable machining conditions.

The process of the present invention aims at avoiding the recurrent frequent appearance of such a hysterisis phenomenon by providing a determination of the sign of the quotient of the variation of the magnitude representing the machining efficiency by a corresponding change in the machining parameter causing the change in efficiency, and by providing the step increments by which the machining parameter is varied or changed a first value when the resulting quotient is positive and at least one second value, greater than the first, when the resulting quotient is negative.

SUMMARY OF THE INVENTION

The object of the present invention, therefore, is to provide a method and apparatus for electrical discharge machining, or EDM, which renders the EDM apparatus self-adaptive and self-corrective to operate at maximum machining efficiency by varying a given machining parameter by steps until optimum efficiency is achieved, the steps by which the given machining parameter is changed having a representative increment which is much smaller in the zone of operation wherein the machining efficiency varies as a function of the machining parameter with a positive slope, such as to limit to a minimum the amplitude of the variations of the machining parameter. In addition, the invention has for object to provide a buffer or safety zone adjacent to the zone of the curve representative of the machining efficiency or performance having a positive slope, and to provide the step increments by which the variable machining parameter is varied with a yet smaller value when operating within the safety zone. The buffer or safety zone has a width which may be made variable as a function of the incursions of the machining efficiency representative curve into the danger zone where the machining efficiency representative curve has a positive slope. The invention therefore provides a new method and apparatus for EDM permitting to limit, or even to completely prevent, incursions of the machining conditions into a critical or danger zone, and which enables the rapid achievement of optimum machining efficiency.

The present invention will be best understood by those skilled in the art when the following description of the best mode contemplated for practicing the invention is read in conjunction with the accompanying attached drawing illustrating an example of such best mode contemplated for practicing the invention and wherein:

DETAILED DESCRIPTION OF THE PREFERRED EMBODIMENTS

Figure 1:
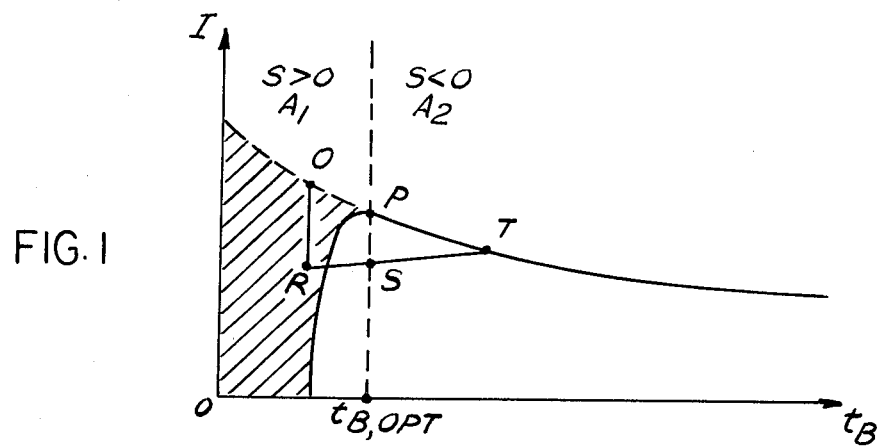
FIG. 1 is a graphic representation of an EDM apparatus performance index as a function of a machining parameter.

Referring to FIG. 1, there is illustrated the general appearance of the performance index curve of an EDM apparatus as a function of a machining parameter, such as the cut-off time interval $t_B$ between two consecutive voltage pulses. Representing the performance index as a function of any other machining parameter such as for example the reference voltage of the servomechanism controlling the gap width between the electrode tool and the electrode workpiece would result in a similar graphic representation. As an example, the performance index is characterized at FIG. 1 as being the graphic representation of the total duration of effective electrical discharges during a predetermined period of time, as disclosed in U.S. Pat. No. 4,090,961 assigned to the same assignee as the present application. On the right of the dashed line corresponding to the top P of the curve corresponding in turn to the cut-off interval time $t_{B,OPT}$ the performance index I decreases substantially, because the number of effective electrical discharge by unit of time decreases. This decrease of effective electrical discharges is generally a function of the length of the cut-off interval $t_B$ between consecutive voltage pulses, and this is why the curve is drawn with a slope S which is negative, or $S<O$. On the left of the top P of the curve, as symbolized by the dashed line, the efficiency index I decreases again because of the apparition of abnormal electrical discharges which can degenerate into localized arcing. This is why that zone, which is characterized by a slope S which is positive, or $S>O$ is called the arcing zone or danger zone.

For a predetermined value of the cut-off time interval $t_B$ within that zone, the efficiency index I decreases as a function of the time. In other words, the relationship between the efficiency index and the duration of the cut-off time interval is no longer univocal or unambiguous, and this is why the zone on the left of the curve is shown cross-hatched for the purpose of symbolizing the fact that the efficiency index I can take any value between zero and its maximum theoretical value.

FIG. 1 represents the present state of the art wherein the magnitude of the difference between consecutive steps of the change in the chosen machining condition parameter remains constant and is not varied in accordance with the sign of the slope of the machining performance or efficiency index I, and provides a graphic understanding of the reason why the performance optimization systems prior to the present invention are subject to unstability or to excessively long optimization-seeking time periods. A narrow step toward optimization is conveniently well chosen as long as optimization is sought in proximity to the top P of the representative curve and along the left-hand portion of the curve, but a narrow step is ill-chosen if it is applied to the right-hand portion of the curve which tolerates without danger steps of a wider amplitude. Inversely, a wide step belongs to the right-hand portion of the curve and provides rapid optimization, but a wide step is a source of great difficulties within the left-hand portion of the curve wherein there exists always the possibility of an accidental incursion into the cross-hatched danger zone. As has been previously mentioned, the rapid downgrading of machining efficiency which occurs while operating in the danger zone cannot be immediately corrected. FIG. 1 illustrates clearly the phenomenom of hysterisis of the response of the machining performance index I as a function of the pulse cut-off duration $t_B$ which is responsible for the unstability of the known prior art systems:

At point P of the representative curve, the monitoring system of the EDM apparatus witnesses a negative slope in the representative curve and the control system reacts by displacing the point of operation towards the left;

At point Q of the representative curve, during a very short period of time, the machining efficiency index I seems to improve momentarily, but it deteriorates rapidly due to the apparation of abnormal electrical discharges;

At point R, the apparatus monitoring and control system recognizes its error and attempts to correct by increasing the duration of the pulse cut-off time interval $t_B$;

At point S, not finding the initial machining efficiency corresponding to the time interval $t_{B,OPP}$ because abnormal discharges continue to occur, the apparatus overcorrects by increasing the duration of the cut-off time intervals $t_B$ step by step. The machining efficiency index I improves, but very slowly until point T is reached, along a line ST which has a positive slope, thus causing the apparatus to further increase the cut-off time interval $t_B$. Subsequently, the cut-off time interval duration $t_B$ is decreased by successive steps until point P of the curve is reached.

At point P, the whole cycle PQRSTP is repeated, because the apparatus has no capacity for memory storage of the existence of a danger zone.

Such an unstable performance is very inefficient, because it results in a general decrease of the machining performance index I. Further, it is to be noted that the deeper and the longer the incursions into the danger zone as a result of a set-up requiring wide step change of the cut-off time interval, the greater the amplitude of the cycle PQRSTP.

FIG. 1 illustrates the essential character of the present invention, which consists in adopting correction steps $A_1$ and $A_2$ for varying or changing the duration of the cut-off time interval $t_B$ that are different according to whether operation is effected along the left-hand or right-hand portion of the performance index representative curve with respect to the top of the curve. The discrimination between the width of the step is obtained by detecting the sign of the derivative. $A_1$ corresponds to the plus sign and $A_2$ to the minus sign. An approximation of the derivative is obtained by obtaining the quotient of the variation of the performance or efficiency index I by the variation of the time interval $t_B$ which has caused that variation of the efficiency index.

The performance index representative curve being sharply curved proximate its top P, it is necessary to multiply the values of the correction step increments $A_1$ and $A_2$ by the slope of the curve, in order to ensure a rapid convergenge towards the top P of the curve when operating far from the top P, and a slow convergence when operating close to the top P. The step increment $A_1$ must be chosen smaller than the step increment $A_2$, such as to compensate for the effect of the steep slope which could lead to overcorrecting. FIG. 1 further indicates that the slope of the curve corresponding to high values of the cut-off time interval $t_B$ is relatively small. Therefore, it is advantageous to select a step increment $A_2$ which is relatively large in order to provide a rapid convergence towards the top P of the curve in this particular portion of the curve, the right-hand portion of the performance index representative curve decreasing as a function of the duration of the cut-off interval $t_B$.

Figure 2:
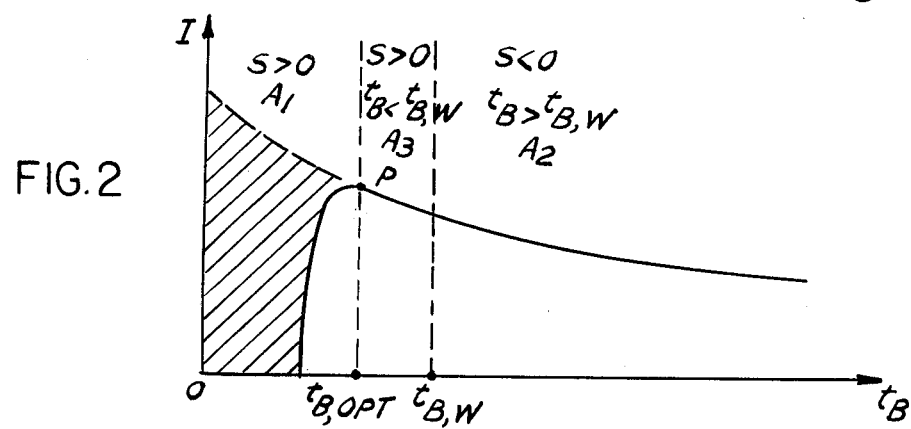
FIG. 2 is a graphic representation of the performance index as illustrated at FIG. 1 provided with an operative safety zone according to the present invention.

FIG. 2 illustrates the manner in which the adverse effects resulting from incursions into the danger zone can be substantially decreased or even completely eliminated. It is possible to detect and memorize the existence of the danger zone. The criterium used is, for example, the detection, subsequent to a negative step, either of the predetermined rate of abnormal discharges, or of a very stiff positive slope. The important point is that, subsequently, a third value $A_3$ is given to the step increment, or to the function factor coefficient relative to the slope when operating in a buffer or safety zone located in the portion of negative slope of the representative curve adjacent to the danger zone in which the slope is positive. At FIG. 2, the safety zone or warning zone is comprised between $t_{B,OPT}$ and $t_{B,W}$.

This third value, $A_3$, for the step increments is chosen smaller than the value $A_2$ of the step increments normally attributed to the negative slope portion of the representative curve, such as to further slow down the approach from the right to the top P of the curve and such as to avoid wide amplitude incursions into the danger zone. It will be appreciated that the method of the present invention can be further refined by subdividing the buffer or safety zone in several zones of progressively decreasing step width, i.e. having decreasing co-efficients of proportionality relative to the slope, designed for progressively slowing down the approach to the top P of the curve and to thus prevent any new incursions of high amplitude into the danger zone.

Figure 3:
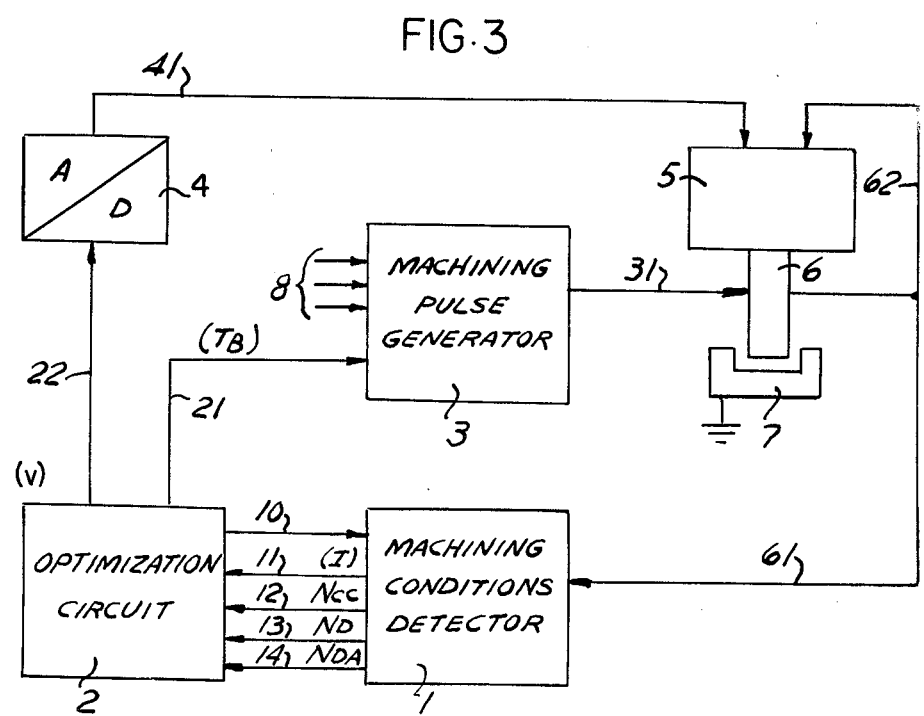
FIG. 3 is a functional block diagram of an apparatus according to the present invention for practicing the method of the invention.

FIG. 3 is a functional block diagram of an example of structure for an apparatus adapted to practice the method of the present invention. An electrode tool 6 is arranged to machine an electrode workpiece 7 by electro-erosion by way of electrical discharges. A line 61 supplies the machining voltage to a machining monitoring component, or machining conditions detector 1. The machining conditions detector 1 provides at separate outputs a performance index I, a short circuit rate $N_{CC}$, a representation of the average triggering delay $N_D$ of the electrical discharges and at least one value $N_{DA}$ representative of the rate of abnormal discharges. Those different magnitudes or values representative of the conditions of machining are obtained by means of appropriate circuits, such as disclosed for example in U.S. Pat. Nos. 4,090,961, 3,739,137 and 3,860,779, and are supplied, for example as encoded binary signals, in parallel on lines 11, 12, 13 and 14, supplying respectively the values I, $N_{CC}$, $N_D$ and $N_{DA}$. An optimization circuit 2 receives at its inputs this information data and provides at its output at least one correction or regulation parameter, for example the duration of the time interval $t_B$ between two consecutive voltage pulses applied across the electrodes 6 and 7.

The optimization circuit 2 also provides at its output an additional parameter such as, for example, a voltage reference U applied to the EDM apparatus servo-mechanism. Preferably, and still for the purpose of giving an example of a component type, the optimization circuit 2 is in the form of a processor such as a mini-computer HEWLETT-PACKARD model 21MX, DIGITAL model PDP-11 or micro-computer INTEL model 8080, ZILOG model Z80. The processor, or optimization circuit 2, triggers the measuring of the machining conditions by the machining conditions detector 1 by a synchronization or timing signal provided through the line 10 to the machining conditions detector 1 which, upon receiving the timing signal, replies by placing each of the lines 11, 12, 13 and 14 to an appropriate voltage in conformity with the results of the measuring. The time interval $t_B$, provided by the processor 2, is supplied by a line 21 to the pulse generator 3 which provides at its output the consecutive voltage pulses, required for machining the workpiece 7 by electrical discharges, through a line 31 connected to the electrode tool 6. Other machining parameters, which are not affected by the self-regulating optimization in the course of a machining operation, are introduced into the pulse generator 3 by way of lines 8. The reference voltage U, provided in a binary form by the optimization circuit processor 2, is applied through a plurality of lines 22 to the input of a digital/analog converter 4, providing at its output an analog signal which is applied through a line 41 to the EDM apparatus servo-mechanism 5. The servo-mechanism 5 receives the machining voltage across the electrodes 6 and 7 through a line 62, provides a value representative of the width of the machining gap between the electrodes and compares it with the voltage reference U for maintaining the gap at its optimum value by controlling the displacement of the electrode tool 6 relative to the electrode workpiece 7 by the servo-mechanism 5.

The representative value of the cut-off time interval duration between consecutive pulses, or $t_B$, which is provided on the line 21 at the output of the optimization circuit 2 and applied to an input of the machining pulse generator 3, has a variable value tending towards $t_{B,OPT}$. Subsequent decreases of the performance index I for sub-optimal cut-off times $t_B$, together with the risk for irreversible arcing in the danger zone, is avoided by memorizing a buffer, safety, or warning zone $t_{B,W}$. This value is used as a memory for the learning system, indicating the proximity of the danger zone. The value $t_{B,W}$ is set to zero at the start of the machining process. It is set to a new value, whenever a decrease of the cut-off interval time $t_B$ results in:

(a) an arc situation, for example the line 14 indicates to the optimization circuit 2 that the rate $N_{DA}$ of abnormal discharge of the arc type is higher than 3%, (b) a drastic decrease of the index I appears on the line 11; it must be understood that a program must be written for the optimization circuit 2 for the evaluation of the slope by effecting at each step the quotient of the variation of I by the variation of $t_B$ which has caused the variation of I. For example, if I is given in percent of its maximum value and if $t_B$ is given in microseconds, a mathematical condition translating "drastic decrease" is a slope value higher than 30.

In both cases (a) and (b) a new value $t_{B,W}$ is set to the product of the preceding value $t_B$ which still yielded no process deterioration by a numerical factor, for example 1.8.

The proportionality factor A is reduced from $A_2=0.15$ to $A_3=0.02$ when $t_B$ is lower than $t_{B,W}$. The numerical values must be understood as an example; the important point is that $A_3$ is lower than $A_2$. As a result, the system learns the position of a danger zone and cautiously adjusts the process with small steps when approaching the said danger zone. This avoids repeated process deteriorations as those illustrated in FIG. 2 and strongly reduces the tendency for arcing.

The safety value $t_{B,W}$ has to be reset if the cause of the process deterioration disappears or if the danger zone shift to lower cut-off interval times. Therefore, $t_{B,W}$ is lowered each time $t_B$ is decreased below the optimum $t_{B,OPT}$ (S>O) and reaches a value lower than half the present safety value without any further process deterioration. By this way $t_{B,W}$ is a moving boundary between the different zones; it may move during a single machining operation, for example because dielectric flushing conditions become more and more difficult.

Having thus described the present invention by way of an example of the method and of the structure involved in practicing the invention, modification thereof will be apparent to those skilled in the art, what is claimed as novel is as follows:

1. A method for machining by electrical discharges an electrode workpiece by means of an electrode tool, wherein consecutive voltage pulses are applied between the electrodes for machining by electro-erosion said electrode workpiece, and wherein a magnitude representing the machining performance index is obtained and a machining parameter is automatically varied by incremental steps such as to provide said magnitude with a maximum value, said method comprising determining a curve representing said magnitude as a function of said machining parameter and giving to each consecutive incremental step a first value when said curve has a positive slope and a second value when said curve has a negative slope, said second value being greater than said first value.

2. The method of claim 1 wherein the value of said incremental step is multiplied by the value of said slope.

3. The method of claim 2 wherein the value of said incremental step is proportional to an instantaneous value of said machining parameter.

4. The method of claim 1 wherein the value of said incremental step is decreased in a zone of machining operation wherein said slope is negative in response to incursions having occurred into a danger zone wherein said slope is positive.

5. The method of claim 4 wherein the value of said incremental step is decreased such as to give to each said incremental step a third value in a safety zone adjacent to said danger zone.

6. The method of claim 1 wherein said machining parameter is the cut-off time interval separating consecutive voltage pulses.

7. An apparatus for machining by electrical discharges an electrode workpiece by means of an electrode tool wherein consecutive voltage pulses are applied between the electrodes, a curve of a magnitude representative of the machining performance index as a function of a machining parameter is established and said machining parameter is varied by incremental steps such as to provide said magnitude with a maximum value, said apparatus comprising a pulse generator for applying between the electrodes consecutive voltage pulses separated by a predetermined cut-off time interval, means for obtaining a first signal indicating the sign of the variation of said magnitude resulting from an incremental step variation of said machining parameter and a second signal indicating the sign of said incremental step, and means for changing the value of each incremental step of the variation of said machining parameter as a logical function of said signals, whereby said incremental step has a first value when said signals are the same and a second value greater than said first value when said signals are different.

8. The apparatus of claim 7 further comprising means for obtaining a third signal representative of the slope of said curve and means for multiplying the value of said incremental step by the value of said third signal.

9. The apparatus of claim 1 further comprising means for obtaining a third signal representative of the instantaneous value of said machining parameter, and means for multiplying the absolute value of said difference by the value of said third signal.

10. The apparatus of claim 7 further comprising means for giving to the value of said incremental step at least a third value in a safety zone adjacent to a danger zone wherein said signals are different, means for memorizing prior incursions into said danger zone, and means for modifying said third value in response to said incursions into said danger zone.

11. The apparatus of claim 7 further comprising means for giving to the value of said incremental step at least a third value in a safety zone adjacent to a danger zone wherein said signals are different, means for memorizing prior incursions into said danger zone, and means for modifying the width of said safety zone in response to said incursions into said danger zone.

12. The apparatus of claim 7 further comprising means for giving to the value of said incremental step at least a third value in a safety zone adjacent to a danger zone wherein said signals are different, means for memorizing prior incursions into said danger zone, and means for modifying said third value and width of said safety zone in response to said incursions into said danger zone.

* * * * *

UNITED STATES PATENT AND TRADEMARK OFFICE
CERTIFICATE OF CORRECTION

PATENT NO. : 4,370,536
DATED : January 25, 1983
INVENTOR(S) : Jean-Pierre Kruth

It is certified that error appears in the above-identified patent and that said Letters Patent are hereby corrected as shown below:

Col. 1, line 13, change "of" to --or--.

Col. 4, lines 11-12, correct the spelling of "phenomenon"

Col. 8, line 29, change "1" to --7--.

Signed and Sealed this

Thirty-first Day of May 1983

[SEAL]

Attest:

DONALD J. QUIGG

Attesting Officer

Acting Commissioner of Patents and Trademarks